(12) United States Patent
Wen et al.

(10) Patent No.: US 11,761,664 B2
(45) Date of Patent: Sep. 19, 2023

(54) SYSTEM AND METHOD OF VENTILATING A UTILITY STRUCTURE

(71) Applicant: Consolidated Edison Company of New York, Inc., New York, NY (US)

(72) Inventors: Yingli Wen, Scarsdale, NY (US); Tomasz Faryna, Highland Mills, NY (US); George Murray, Glen Cove, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 110 days.

(21) Appl. No.: 17/240,352

(22) Filed: Apr. 26, 2021

(65) Prior Publication Data
US 2021/0348796 A1 Nov. 11, 2021

Related U.S. Application Data

(60) Provisional application No. 63/021,332, filed on May 7, 2020.

(51) Int. Cl.
| F24F 11/74 | (2018.01) |
| F24F 11/88 | (2018.01) |
| F24F 11/00 | (2018.01) |
| F24F 13/02 | (2006.01) |

(52) U.S. Cl.
CPC .......... *F24F 11/74* (2018.01); *F24F 11/0001* (2013.01); *F24F 11/88* (2018.01); *F24F 13/029* (2013.01)

(58) Field of Classification Search
CPC ........ F24F 11/0001; F24F 11/88; F24F 11/74; F24F 2110/65; F24F 2110/66; F24F 2110/68; F24F 2110/70; F24F 2110/72; F24F 2110/74; F24F 2110/76; E02D 29/14
See application file for complete search history.

(56) References Cited

U.S. PATENT DOCUMENTS

| 3,610,524 A | * | 10/1971 | Wallen | ...................... F24D 5/02 454/48 |
| 3,864,437 A | | 2/1975 | Blaszkowski | |
| 4,515,071 A | * | 5/1985 | Zach | ....................... F26B 21/00 34/233 |

(Continued)

FOREIGN PATENT DOCUMENTS

| CN | 106930328 A | 7/2017 |
| CN | 107034926 A | 8/2017 |

(Continued)

*Primary Examiner* — Nelson J Nieves
(74) *Attorney, Agent, or Firm* — CANTOR COLBURN LLP (57) ABSTRACT

A system and method for ventilating a utility structure enclosed by a vented cover is provided. The system includes at least one air movement device coupled to the cover. A first induction loop is electrically coupled to the at least one air movement device, the first induction loop being coupled to the cover. A second induction loop is disposed in the utility structure, the second induction loop being inductively coupled to the first induction loop. A gas sensor is operably coupled to the second induction loop to direct electrical power to the second induction loop in response to a gas level being equal to or exceeding a predetermined threshold.

7 Claims, 6 Drawing Sheets

(56) References Cited

U.S. PATENT DOCUMENTS

| | | | |
|---|---|---|---|
| 4,593,714 A | 6/1986 | Madden | |
| 4,662,268 A * | 5/1987 | Beavers | F24F 7/065 |
| | | | 454/344 |
| 4,953,450 A * | 9/1990 | Remondino | F24F 7/013 |
| | | | 454/343 |
| 5,062,735 A | 11/1991 | Gaudin | |
| 5,820,828 A | 10/1998 | Ferone | |
| 6,168,514 B1 * | 1/2001 | Weston | E03F 5/08 |
| | | | 454/48 |
| 6,457,901 B1 | 10/2002 | Sondrup | |
| 6,743,088 B2 * | 6/2004 | Closkey | E02D 29/149 |
| | | | 96/6 |
| 6,889,948 B2 * | 5/2005 | Melancon | F16L 23/02 |
| | | | 248/309.1 |
| 9,605,403 B1 * | 3/2017 | Putnam | E02D 29/14 |
| 2012/0227168 A1 * | 9/2012 | Paoluccio | E03C 1/1225 |
| | | | 4/220 |
| 2014/0246901 A1 * | 9/2014 | Ichikawa | B60L 1/003 |
| | | | 307/104 |
| 2014/0322570 A1 * | 10/2014 | Nakamura | B60L 53/126 |
| | | | 429/120 |
| 2016/0356521 A1 * | 12/2016 | Bertini | F24F 13/02 |
| 2016/0356522 A1 * | 12/2016 | Bertini | F24F 13/029 |
| 2017/0284689 A1 * | 10/2017 | Steele | F24F 11/63 |
| 2018/0294681 A1 * | 10/2018 | Bae | H02J 50/80 |
| 2018/0351414 A1 * | 12/2018 | Park | H02J 50/005 |
| 2018/0363940 A1 | 12/2018 | Bertini et al. | |
| 2019/0166413 A1 * | 5/2019 | Klinger | G01N 33/0063 |
| 2020/0116686 A1 * | 4/2020 | Bertini | G01N 33/0006 |

FOREIGN PATENT DOCUMENTS

| | | |
|---|---|---|
| CN | 208857846 A | 5/2019 |
| JP | H03156035 A | 7/1991 |
| JP | 2013167078 A | 8/2013 |
| JP | 2015042816 A | 3/2015 |

* cited by examiner

SYSTEM AND METHOD OF VENTILATING A UTILITY STRUCTURE

CROSS REFERENCE TO RELATED APPLICATIONS

This application claims the benefit of U.S. Provisional Application Ser. No. 63/021,332 filed May 7, 2020, the entire disclosure of which is incorporated herein by reference.

BACKGROUND

The subject matter disclosed herein relates to a system and method of monitoring and ventilating spaces or structures that include electrical utility equipment, and in particular to a system and method of determining an undesired condition and taking appropriate action.

Electrical utilities have a number of metrics that are used to track performance and customer satisfaction. These metrics, which include the system average interruption frequency index ("SAIFI"), the customer average interruption duration index ("CAIDI"), and for some utilities, the momentary average interruption frequency index ("MAIFI"). SAIFI measures the average number of interruptions that a customer would experience during a time period, such as a year. CAIDI measures the duration of the interruption that a customer would experience, and is generally a few hours per year. MAIFI measures the number of power interruptions that have a duration of less than five minutes that a customer would experience during a given time period.

Some or all of these metrics are also used by government regulators to aid in determining if the electrical utility is adhering to the regulations in maintaining a durable and reliable electrical distribution network. As a result, electrical utility and distribution companies have developed system architectures that minimize the duration and frequency of power outages.

It should be appreciated that as a result of these metrics, electrical utilities have incentive to maintain equipment in operating order and to quickly determine when a condition occurs that is either impacting the distribution of electrical power or has the potential to effect reliability of the electrical network. Often conditions are monitored by utility personnel who visually inspect and manually perform measurements on electrical equipment and facilities where it is located. It should be appreciated that if an undesired condition arises in the utility structure, it may result in the loss of electrical power to a large geographic region.

Accordingly, while existing monitoring systems are suitable for their intended purposes the need for improvement remains, particularly in providing a system that allows for the automatic venting of underground utility structures in response to an undesired condition.

BRIEF DESCRIPTION

According to one aspect of the disclosure a system for ventilating a utility structure enclosed by a vented cover is provided. The system includes at least one air movement device coupled to the cover. A first induction loop is electrically coupled to the at least one air movement device, the first induction loop being coupled to the cover. A second induction loop is disposed in the utility structure, the second induction loop being inductively coupled to the first induction loop. A gas sensor is operably coupled to the second induction loop to direct electrical power to the second induction loop in response to a gas level being equal to or exceeding a predetermined threshold.

In addition to one or more of the features described herein, or as an alternative, further embodiments of the system may include a buck/boost inverter being electrically disposed between the at least one air movement device and the first induction loop. In addition to one or more of the features described herein, or as an alternative, further embodiments of the system may include a high frequency power supply electrically coupled to the second induction loop. In addition to one or more of the features described herein, or as an alternative, further embodiments of the system may include the high frequency power supply being configured to change a first frequency of the electrical power to a second frequency. In addition to one or more of the features described herein, or as an alternative, further embodiments of the system may include the first frequency is 60 Hz and the second frequency is about 80 kHz.

In addition to one or more of the features described herein, or as an alternative, further embodiments of the system may include the cover having a plurality of ribs on an underside of the cover, the at least one air movement device being disposed between at least two of the ribs. In addition to one or more of the features described herein, or as an alternative, further embodiments of the system may include the gas sensor being configured to measure a level or concentration of CO or the other undesired gas in a structure.

According to one aspect of the disclosure a method of ventilating a utility structure having a vented cover is provided. The method including detecting a gas level is equal to or above a threshold. A first electrical power is directed to a second induction loop. A voltage is induced in a first induction loop and generating a second electrical power when the first electrical power is directed to the second induction loop. An air movement device is activated in response to the generating of the second electrical power.

In addition to one or more of the features described herein, or as an alternative, further embodiments of the method may include generating the second electrical power with a buck/boost inverter electrically disposed between the air movement device and the first induction loop. In addition to one or more of the features described herein, or as an alternative, further embodiments of the method may include changing a frequency of the first electrical power prior to directing the first electrical power to the second induction loop. In addition to one or more of the features described herein, or as an alternative, further embodiments of the method may include the frequency being changed from 60 Hz to about 80 kHz.

In addition to one or more of the features described herein, or as an alternative, further embodiments of the method may include the gas level being detected with a sensor disposed in the utility structure. In addition to one or more of the features described herein, or as an alternative, further embodiments of the method may include activating a switch with the sensor when the gas level is equal to or above the threshold. In addition to one or more of the features described herein, or as an alternative, further embodiments of the method may include the sensor being configured to measure an undesired gas.

According to another aspect of the disclosure a system is provided. The system including a utility structure defining an enclosed space, the enclosed space having an entrance. A vented cover is disposed on the entrance, the cover having a plurality of vent openings. An air movement device is coupled to the cover to direct air through at least one of the plurality of vents. A first induction loop is electrically coupled to the air movement device. A second induction loop is coupled to the utility structure adjacent the entrance, the second induction loop being inductively coupled with the first induction loop. A gas sensor is configured to measure a gas level, the gas sensor being configured to direct a first electrical power to the second induction loop in response to the gas level being above a threshold.

In addition to one or more of the features described herein, or as an alternative, further embodiments of the system may include a buck/boost inverter being electrically disposed between the at least one air movement device and the first induction loop. In addition to one or more of the features described herein, or as an alternative, further embodiments of the system may include a high frequency power supply electrically coupled to the second induction loop. In addition to one or more of the features described herein, or as an alternative, further embodiments of the system may include the high frequency power supply being configured to change a first frequency of the electrical power to a second frequency. In addition to one or more of the features described herein, or as an alternative, further embodiments of the system may include the first frequency is 60 Hz and the second frequency is about 80 kHz.

In addition to one or more of the features described herein, or as an alternative, further embodiments of the system may include the cover having a plurality of ribs on an underside of the cover, the at least one air movement device being disposed between at least two of the ribs. In addition to one or more of the features described herein, or as an alternative, further embodiments of the system may include the gas sensor being configured to measure a level or concentration of an undesired gas accumulated in a structure.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a system for automatically venting a utility structure, such as an underground or subterranean space for example. Further embodiments provide for a vented cover (e.g. a vented manhole cover) for the utility structure that includes a ventilation device that is electrically, but not physically, connected to a power source. Still further embodiments enhance the working conditions for personnel working in and around a utility structure.

Figure 1:
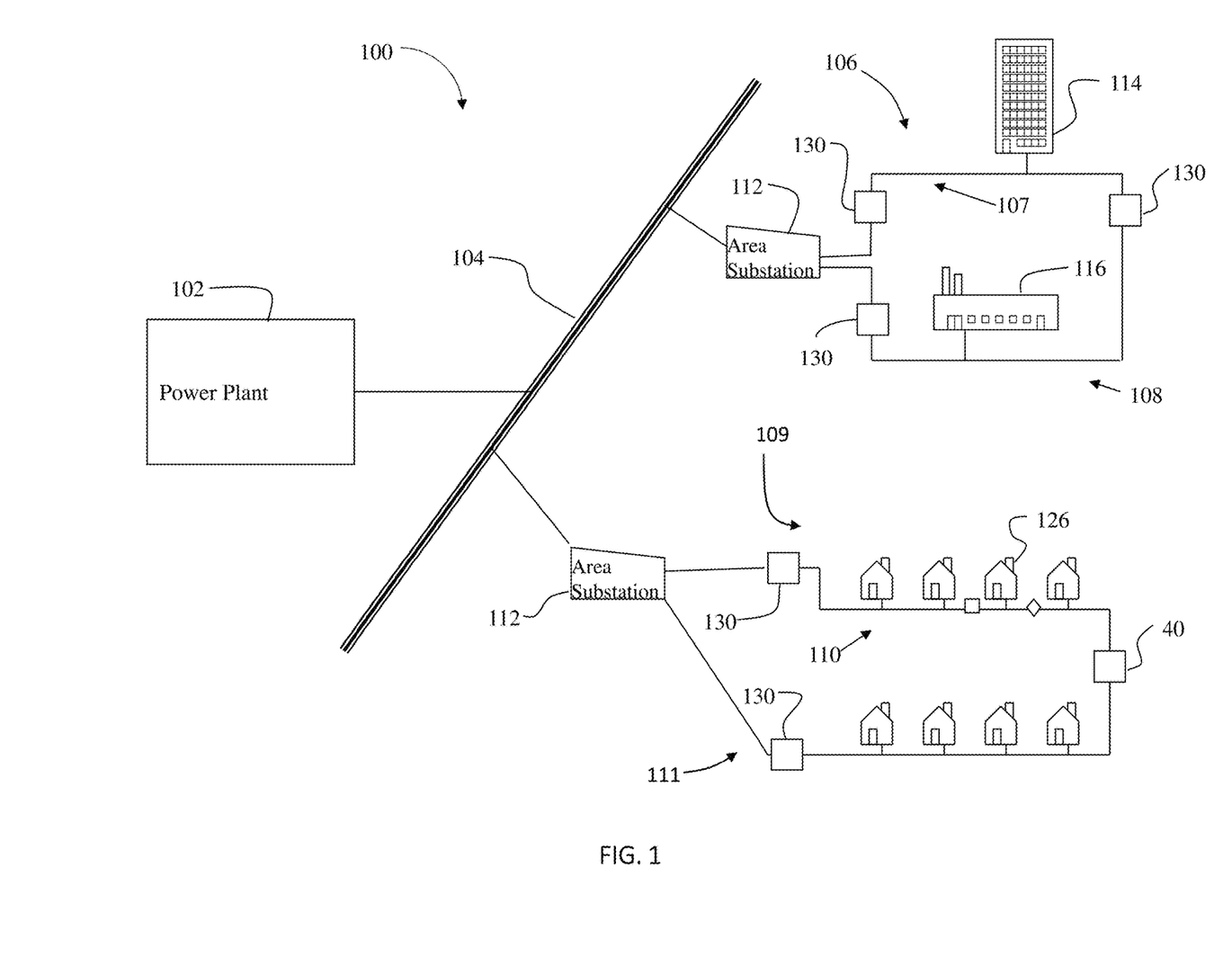
FIG. 1 is a schematic illustration of a utility electrical distribution system.

Referring now to FIG. 1, an embodiment is shown of a utility electrical distribution system 100. The utility system 100 includes one or more power plants 102 connected in parallel to a main transmission system 104. The power plants 102 may include, but are not limited to: coal, nuclear, natural gas, or incineration power plants. Additionally, the power plants 102 may include one or more facilities that generate electricity based on renewable energy sources, such as but not limited to hydroelectric, solar, or wind turbine power plants. It should be appreciated that additional components such as transformers, switchgear, fuses and the like (not shown) may be incorporated into the utility system 100 to provide for the efficient operation of the system. The utility system 100 is typically interconnected with one or more other utility networks to allow the transfer of electrical power into or out of the utility system 100.

The main transmission system 104 typically consists of high transmission voltage power lines, anywhere from 69 KV to 500 KV for example, and associated transmission and distribution equipment which carry the electrical power from the point of production at the power plants 102 to the end users located on local electrical distribution systems 106, 109. The local distribution systems 106, 109 are connected to the main distribution system by area substations 112 which reduce transmission voltage to distribution levels such as 13 KV, 27 KV or 33 KV. Area substations 112 typically contain one or more transformers, switching, protection, and control equipment. Area substations 112 all include circuit breakers to interrupt faults such as short circuits or over-load currents that may occur. Substations 112 may also include equipment such as fuses, surge protection, controls, meters, capacitors, and load tap changers for voltage regulation.

The area substations 112 connect to one or more local electrical distribution systems, such as local distribution system 106, for example, that provides electrical power to a commercial area having end users such as an office building 114 or a manufacturing facility 116. In an embodiment, the area substation 112 may have two or more feeder circuits that provide electrical power to different feeder circuit branches 107, 108 of the local distribution system 106.

The residential distribution system 109 includes one or more residential buildings 126 and light industrial or commercial operations. Similar to the commercial distribution network 106, the residential system 109 is divided into multiple branch feeders 110, 111 that are fed by the substation 112. In an embodiment, the local distribution system 109 is arranged such that approximately up to 6 MVA of power is provided on each branch circuit for electrical loads such as residential buildings.

Figure 2:
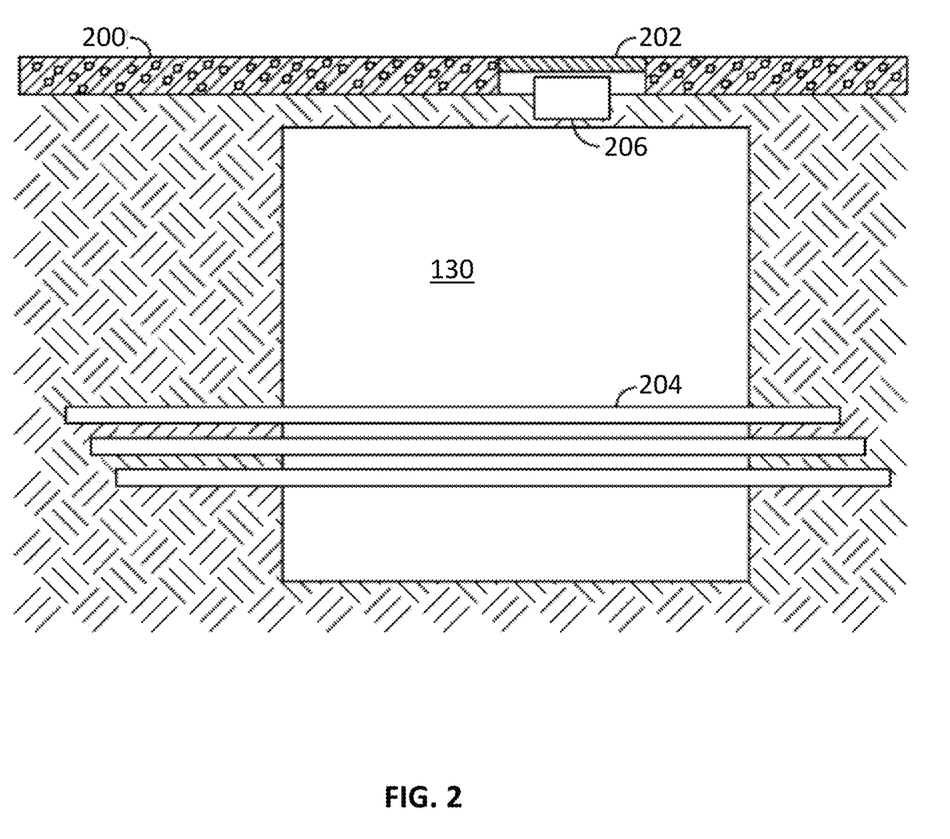
FIG. 2 is an illustration of a utility structure.

It should be appreciated that the distribution systems 106, 109 may include facilities, such as underground chambers or structures 130 that house equipment or provide the electrical utility access to electrical conductors (e.g. power lines). These subterranean or utility structures 130 are typically accessed by an entrance opening in the ground, such as in a sidewalk or street 200. The openings are sized to allow service personnel to pass therethrough and are enclosed by a cover, also referred to as a manhole cover 202 (FIG. 2). The manhole cover 202 is removably coupled to the opening. In some embodiments, the weight of the manhole cover 202 (e.g. >200 lbs.) holds the cover 202 in place until service personnel remove it from the opening. It should be appreciated that it is desirable to monitor the conditions within the utility structure 130, such as for the presence of undesired matter (e.g. gases). Some prior art system that monitor conditions of the utility structure 130 may include a remote monitoring device 206 that includes a plurality of sensors. In an embodiment, the remote monitoring device 206 may be that described in commonly owned U.S. Pat. No. 10,344,446 entitled "System and Method of Monitoring a Utility Structure", the contents of which is incorporated herein by reference.

Figure 3A:
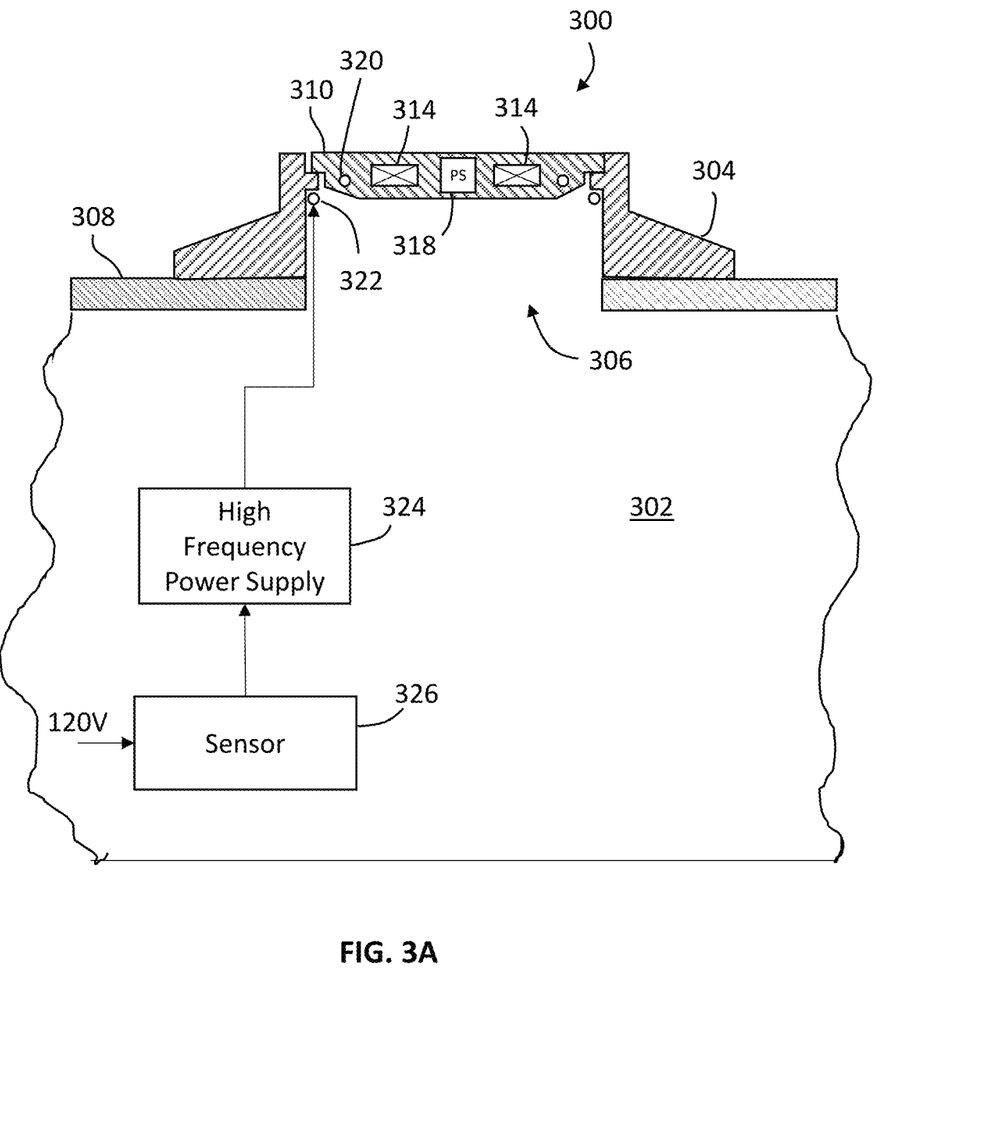
FIG. 3A, FIG. 3B and FIG. 3C are illustrations of a utility structure ventilation system in accordance with an embodiment.
Figure 3B:
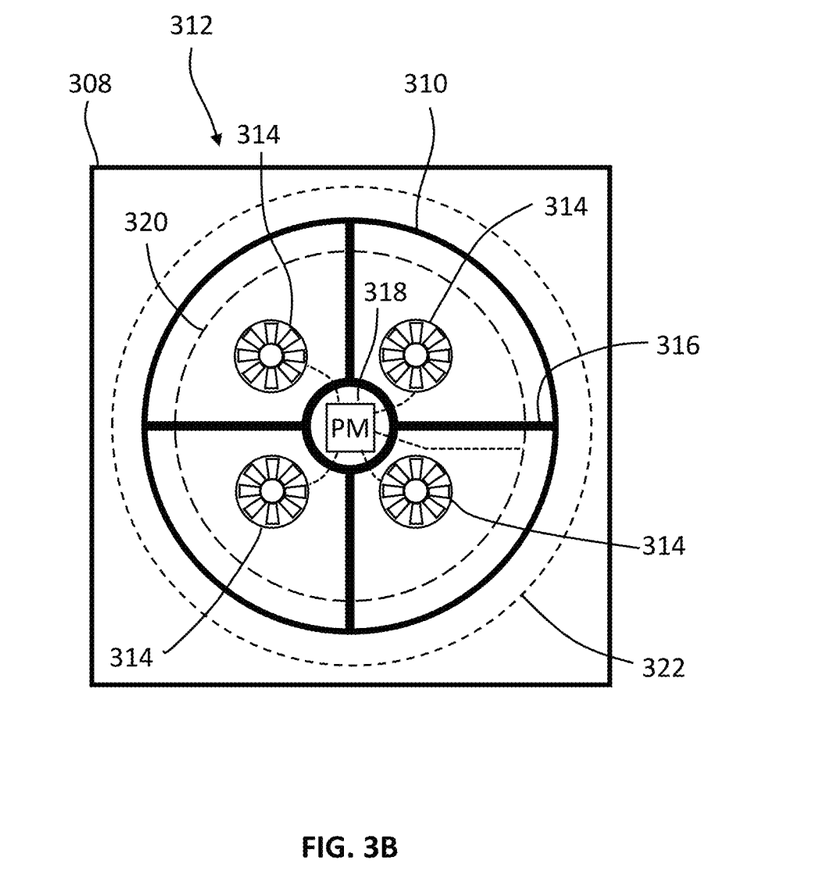
Figure 3C:
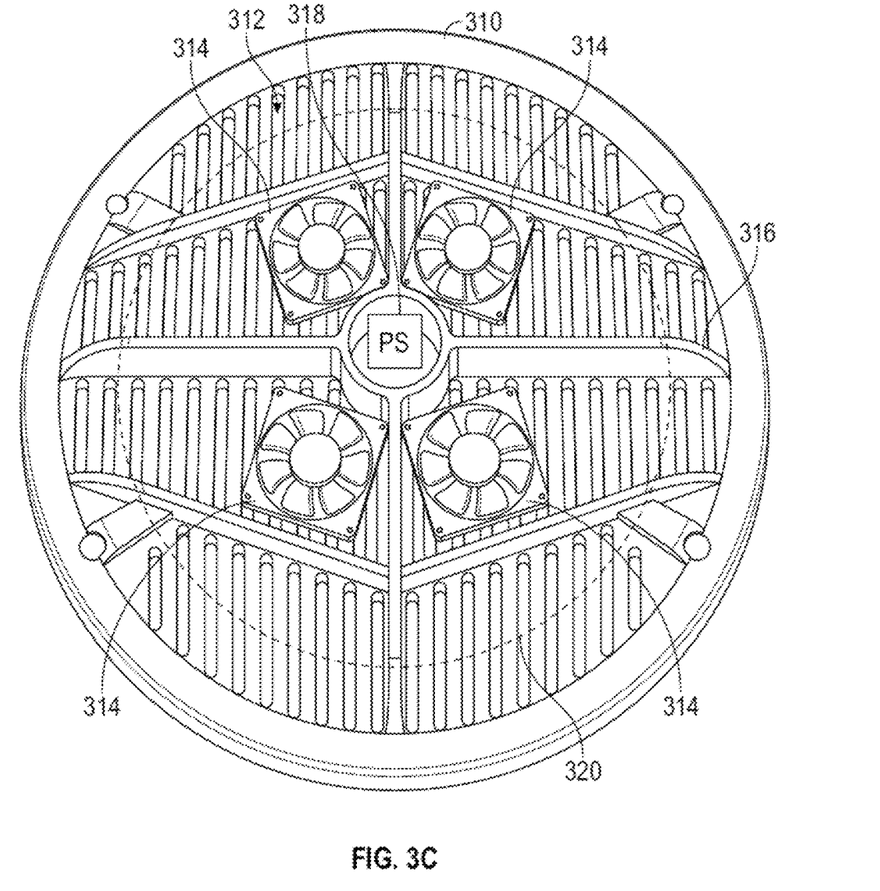

Referring now to FIG. 3A-3C, an embodiment is shown of a ventilation system 300 for a utility structure 302, such as an underground or subterranean space for example. It should be appreciated that the utility structure 302 may include utilities, such as but not limited to electrical power conductors for example. In an embodiment, the utility structure 302 includes a frame 304 at an entrance 306. In an embodiment, the frame 304 is coupled to the surface or street 308. The frame 304 and the entrance 306 are covered by a vented cover 310 (e.g. vented manhole cover). In an embodiment, the cover 310 is a standard manhole cover having a plurality of ventilation slots 312 (FIG. 3C) that has been retrofitted with the components of system 300.

In an embodiment, the system 300 includes a plurality of fans 314. In an embodiment, the fans 314 are mounted to the bottom side of the cover 310. As used herein, the "bottom" of the cover 310 faces the interior of the utility structure 302. In an embodiment, the cover 310 may include one or more ribs 316. The fans 314 may be mounted in between the ribs 316. In some embodiments, the height of the fan 314 is smaller than the rib 316, which provides advantages in protecting the fans 314 from damage when the cover 310 is removed from the entrance 306 (e.g. placed on the ground).

The system 300 further includes a power supply 318 and a first induction loop 320. The power supply 318 is configured to adapt electrical characteristics of electrical power received from the first induction loop 320 to that used by the fans 314. In the illustrated embodiment, the power supply 318 is an inverter that converts 5V-30 Vac to 24 Vdc. The first induction loop 320 has a substantially circular shape and is mounted to the underside of the cover 310 adjacent an outer circumference of the cover 310.

The first induction loop 320 is configured to inductively receive a magnetic field from a transmitting or second induction loop 322 and generate a voltage in response. In the illustrated embodiment, the second induction loop 322 is coupled to the frame 304 adjacent the cover 310. The second induction loop 322 has a diameter that is larger than the first induction loop. It should be appreciated that by coupling the second induction loop 322 to the frame 304, the second induction loop 322 can be positioned such that it does not interfere with the operations of the utility personnel that are entering or exiting the utility structure 302. In other words, the utility personnel can enter and exit the entrance 306 in the same manner as a utility structure that does not include system 300. It should be appreciated that while the illustrated embodiment shows the second induction loop 322 as being coupled to the frame, this is for example purposes and the claims should not be so limited. In other embodiments, the second induction loop 322 may be coupled to other components or portions of the utility structure 302 or the street 308.

The second induction loop 322 and the first induction loop 320 are inductively coupled such that a magnetic field generated by the second induction loop 322 induces a voltage in the first induction loop 320. It should be appreciated that this eliminates a wire or other physical connection between the fans 314 and the sensor 326/power source. As a result advantages are gained in facilitating access to the utility structure by utility personnel. In an embodiment, the second induction loop is configured as 30 turns AGW #24 Cu. The second induction loop 322 is electrically coupled to a high frequency power supply 324. In an embodiment the high frequency power supply 324 is disposed within the utility structure 302. In the illustrated embodiment, the high frequency power supply 324 outputs the electrical power to the second induction loop 322 at approximately ~80 kHz.

The high frequency power supply 324 is electrically coupled to a sensor 326. The sensor 326 is configured to direct 120 Vac electrical power (e.g. via a relay) to the high frequency power supply 324 in response to an undesired condition. In the illustrated embodiment the sensor 326 is a gas sensor configured to measure a gas level, such as a level carbon monoxide (CO) for example, in the utility structure 302. It should be appreciated that it is undesired to have utility personnel enter a utility structure having undesired gas levels of some predetermined gases, such as CO. In other embodiments, the sensor 326 may include one or more sensors that detect one or more gases, such as but not limited to CO, methane, natural gas, combustible gases, and the like.

It should be appreciated that when an undesired condition (e.g. CO above a threshold) is detected by the sensor, the 120 Vac electrical power will be transferred to the fans 314. The activation of the fans 314 will pull air from the utility structure 302 causing the fresh air to flow into the utility structure. Thus, the undesired gas will become diluted by the in flowing air and the level of the undesired gas will decrease.

Figure 4:
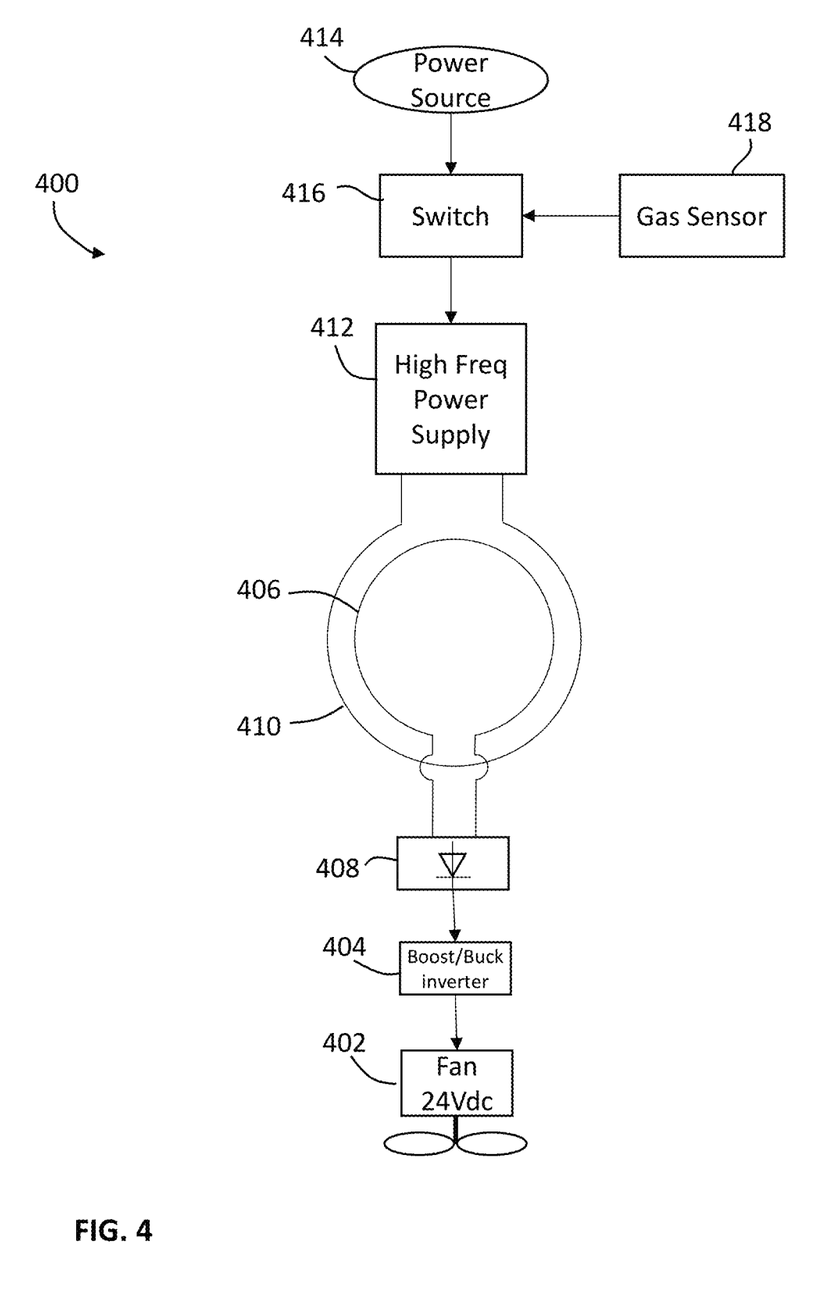
FIG. 4 is a schematic illustration of ventilation system for use at the subterranean space or utility structure in accordance with an embodiment.

Referring now to FIG. 4, another embodiment of a venting system 400 is shown for a utility structure. In this embodiment, the system 400 includes an air movement device 402, such as a fan. In this embodiment, the air movement device 402 operates on 24 Vdc and is coupled to manhole cover for the utility structure. The electrical power is provided via a buck/booster inverter 404. The inverter 404 receives electrical power from a first induction loop 406 via an AC/DC converter 408. In an embodiment, the AC/DC converter converts the AC electrical power generated by the inductive coil into a DC current used to operate the fans.

The first induction loop 406 is inductively coupled to a second induction loop 410. The inductive coupling allows generation of electrical power by the first induction loop 406 to operate the fans. The second induction loop 410 is in the form of a coil that generates a magnetic field that induces a voltage in the first induction loop 406. The second induction loop 410 is coupled to a high frequency (~80 kHz) power supply 412. It is energized from a preexisting 120 Vac-60 Hz energy source readily available inside the utility structure 130 and outputs electrical power at a high frequency, such as approximate 80 kHz.

The high frequency power supply 412 receives the 120 Vac electrical power from a power source 414. In an embodiment 120 Vac input to the high frequency power supply 412 in response to the activation of a switch 416. In an embodiment switch 416 is activated by a gas sensor 418. It should be appreciated that while the switch 416 is illustrated as being separate from the gas sensor 418, in some embodiments the switch 416 and gas sensor 418 are integral components.

In operation, the gas sensor 418 monitors the gas levels within the utility structure. When an undesired gas level exceeds a predetermined threshold, the gas sensor 418 activates switch 416 allowing electrical power to flow from the power source 414 to the high frequency power supply 412. The output electrical power from the high frequency power supply 412 flows to the second induction loop 410, which generates a High Frequency (HF) magnetic field.

The HF magnetic field is received by the first induction loop 406, which induces a voltage that drives the inverter 404 to output electrical power adapted to operate the air movement device 402. Once the air movement devices 402 are operating, air (including the undesired gas) within the utility structure is forced out through the vent openings in the manhole cover and into the environment. The flowing of the air out of the utility structure causes air from the environment to flow into the utility structure to replace the expelled air. It should be appreciated that as the air within the utility structure is replaced, the undesired gas levels will decrease. Once the undesired gas levels fall below a predetermined threshold, the switch 416 is deactivated and the air movement devices 402 are turned off.

It should be appreciated that while embodiments herein may refer to a particular undesired gas, such as CO, this is for example purposes and the claims should not be so limited. Further, while some embodiments may refer to the utility structure as being subterranean, this is for example purposes and the claims should not be so limited. In other embodiments, the utility structure may be partially underground or above ground for example.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A system comprising:
    a utility structure defining an enclosed space, the enclosed space having an entrance opening;
    a cover disposed on the entrance opening, the cover having a plurality of vent openings;
    an air movement device coupled to the cover to direct air through at least one of the plurality of vent openings;
    a first induction loop electrically coupled to the air movement device;
    a second induction loop coupled to the utility structure adjacent the entrance opening, the second induction loop being inductively coupled with the first induction loop; and
    a gas sensor configured to measure a gas level, the gas sensor being configured to direct a first electrical power to the second induction loop in response to the gas level being above a threshold.

2. The system of claim 1, further comprising a buck/boost inverter being electrically disposed between the air movement device and the first induction loop.

3. The system of claim 2, further comprising a high frequency power supply electrically coupled to the second induction loop.

4. The system of claim 3, wherein the high frequency power supply is configured to change a first frequency of an electrical power to a second frequency.

5. The system of claim 4, wherein the first frequency is 60 Hz and the second frequency is about 80 kHz.

6. The system of claim 1, wherein the cover includes a plurality of ribs on an underside of the cover, the air movement device being disposed between at least two of the plurality of ribs.

7. The system of claim 6, wherein the gas sensor is configured to measure a level or concentration of carbon monoxide accumulated in the utility structure.

* * * * *